United States Patent [19]

Wilde et al.

[11] 4,221,114
[45] Sep. 9, 1980

[54] GAS TURBINE JET PROPULSION ENGINE

[75] Inventors: Geoffrey L. Wilde, Derby; Jack Britt, Ambergate, both of England

[73] Assignee: Rolls-Royce Limited, London, England

[21] Appl. No.: 745,808

[22] Filed: Nov. 29, 1976

Related U.S. Application Data

[63] Continuation of Ser. No. 338,201, Mar. 5, 1973, abandoned, which is a continuation of Ser. No. 12,516, Jan. 21, 1970, abandoned, which is a continuation-in-part of Ser. No. 697,560, Jan. 5, 1968, abandoned.

[30] Foreign Application Priority Data

Jan. 18, 1967 [GB] United Kingdom ................. 2741/67

[51] Int. Cl.² ........................... F02K 3/06; F02K 1/16
[52] U.S. Cl. ..................................... 60/242; 60/233; 60/261; 60/262
[58] Field of Search ................. 60/226, 236, 261, 262, 60/39.16, 242

[56] References Cited

U.S. PATENT DOCUMENTS

| 2,931,173 | 4/1960 | Schapker | 60/39.16 |
| 2,999,672 | 9/1961 | Harshman | 60/261 |
| 3,273,340 | 9/1966 | Hull, Jr. | 60/39.16 |
| 3,316,714 | 5/1967 | Smith et al. | 60/39.65 |
| 3,514,952 | 6/1970 | Schumacher et al. | 60/39.16 |

FOREIGN PATENT DOCUMENTS

| 161680 | 3/1955 | Australia | 60/226 |
| 1151368 | 8/1957 | France | 253/78 |
| 774501 | 5/1957 | United Kingdom | 253/78 |

Primary Examiner—Stephen C. Bentley
Attorney, Agent, or Firm—Cushman, Darby & Cushman

[57] ABSTRACT

A gas turbine engine has three turbines, the intermediate and high pressure turbines running at substantially constant corrected speed. The low pressure turbine has variable nozzle guide vanes and the low pressure compressor has variable stators so as to enable its speed to be varied, while its mass flow is arranged to be large at low speeds.

8 Claims, 1 Drawing Figure

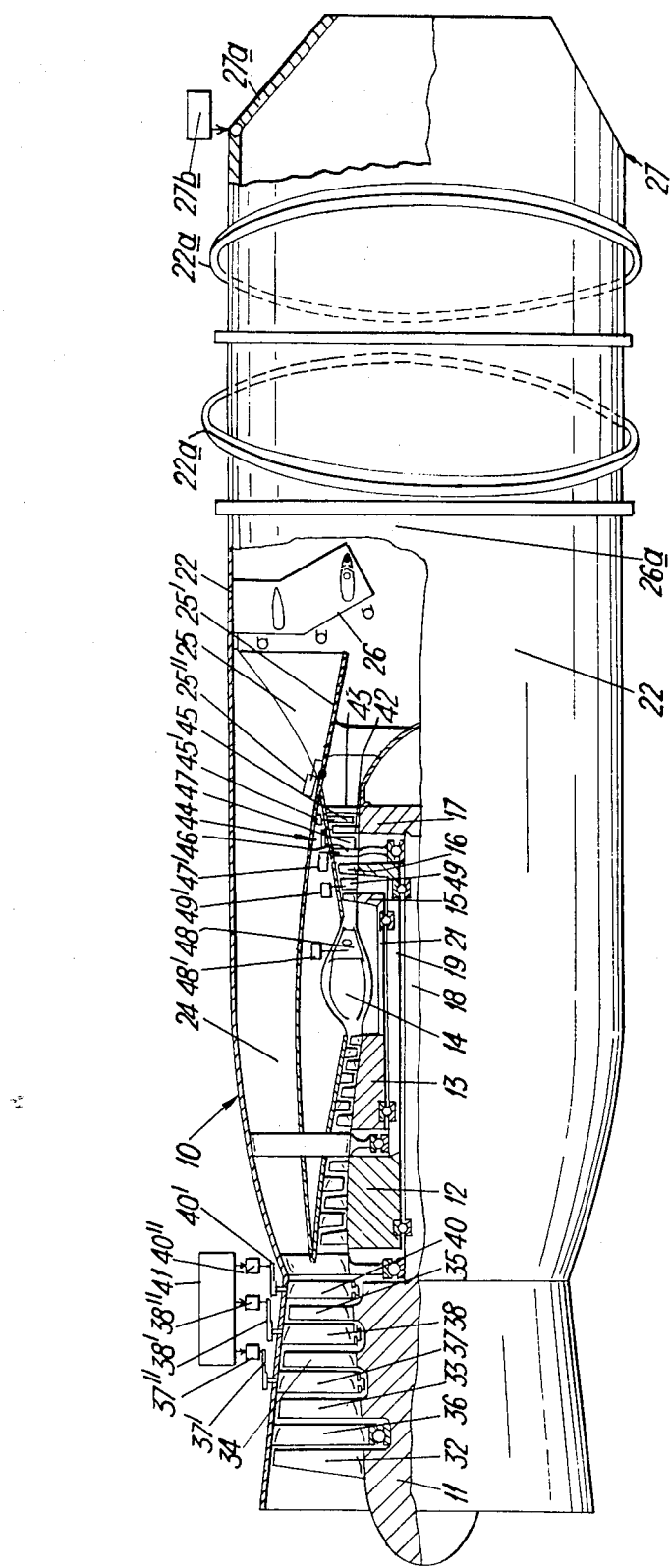

GAS TURBINE JET PROPULSION ENGINE

This is a continuation of application Ser. No. 338,201 filed Mar. 5, 1973, (now abandoned) as a continuation of application Ser. No. 12,516 filed Jan. 21, 1970 (now abandoned) as a continuation-in-part of application Ser. No. 697,560, filed Jan. 5, 1968 (now abandoned).

At the present time is a need for a gas turbine engine which will cruise with maximum efficiency at both supersonic and subsonic speeds of the aircraft in which the engine is mounted, and which will, in addition, be efficient in tactical aircraft where high speed and high acceleration performance are required.

Accordingly, to satisfy this need the engine must be capable of high thrust to provide suitable acceleration up to supersonic speed and also to take-off. For high thrust to be produced, a high mass flow of air through the combustion equipment of the engine is necessary and this means that the engine must have a relatively low by-pass ratio. For cruise conditions, where maximum efficiency is required, a relatively high by-pass ratio is required for the optimum fuel consumption. It would appear that it is solely necessary to design the aircraft to have a variable by-pass ratio, but this is not so; it is also necessary to design the low pressure compressor so that it can handle the high mass flow at high thrust conditions.

It is, therefore, an object of the present invention to produce a gas turbine engine which will cruise with maximum efficiency at both supersonic and subsonic speeds on the aircraft in which the engine is mounted and which will, in addition, be efficient in tactical aircraft where high speed and high acceleration performance are required.

To achieve this object it is necessary to provide the engine with the following features:

(1) Variable stators on at least the last stage of the low pressure compressor.

(2) A low pressure compressor having an outlet end which has an annulus area which is larger than conventional for efficient operation of the low pressure compressor at the higher rotational speed end of its useful speed range.

(3) Variable low pressure turbine guide vanes, the angle of which alters the rotational speed of the low pressure turbine and, directly, the speed of the low pressure compressor and hence the effective by-pass ratio.

(4) A mixing device providing a large area communication between the downstream end of the by-pass duct and the exhaust duct.

(5) A variable effective area final nozzle.

For high thrust, the low pressure compressor is rotated as fast as possible, limited by the engine capability by moving the low pressure turbine guide vanes. The variable effective area final nozzle is adjusted to give the required low pressure compressor operating condition. In view of the high low pressure compressor speed there is an increase in pressure in the jet pipe and the by-pass duct so that less of the air passes to the by-pass duct and more through the engine. Thus the by-pass ratio falls.

For cruise conditions at low thrust, the low pressure compressor is slowed down by opening the low pressure turbine guide vanes, the variable effective area final nozzle is again adjusted to give the required low pressure compressor operating condition. In view of the relatively low pressure compressor speed there is a decrease in pressure in the jet pipe and the by-pass duct so that more air passes to the by-pass duct and less through the engine. Thus the by-pass ratio rises. To ensure that the low pressure compressor operates efficiently when passing a relatively high mass flow at low speed the variable stators on the low pressure compressor are altered accordingly and the outlet end of the low pressure compressor is made larger than a conventional compressor exit for efficient operation of the low pressure compressor.

The larger than conventional low pressure compressor outlet also ensures maximum mass flow at low pressure ratios, the variable stators on the low pressure compressor correct the air flow angles in the low pressure compressor without which the air axial velocities towards the compressor exit cause choking of the final stages.

According, therefore, to the present invention there is provided a by-pass gas turbine jet propulsion engine comprising in flow series independently rotatable low and high pressure axial flow compressors, combustion equipment, independently rotatable high and low pressure turbines drivingly connected to the high and low pressure compressors respectively, an exhaust duct, a by-pass duct which is arranged to receive at its upstream end a proportion of the air compressed by the low pressure compressor, a mixing device providing a large area communication between the downstream end of said by-pass duct and said exhaust duct, the low pressure turbine having at least one stage of variable nozzle guide vanes and the exhaust duct having an outlet nozzle of variable effective area, said low pressure compressor and said turbine having their rotational speed controlled by controlling said nozzle guide vanes and said outlet nozzle, said low pressure compressor having an outlet end which has an annulus area which is larger than conventional for efficient operation of said low pressure compressor at the higher rotational speed end of its useful speed range, and said low pressure compressor having a plurality of stages, at least the stage nearest the high pressure compressor being provided with a stage of variable incidence stator blading whereby the low pressure compressor is adapted to pass a relativey high mass flow at lower rotational speeds of its useful speed range, the effective by-pass ratio of the engine being controlled by controlling the rotational speed of the low pressure compressor and turbine and effective area of the outlet nozzle.

This combination achieves the object of the present invention of high performance at subsonic and supersonic speeds, by varying the by-pass ratio by means of the low pressure turbine nozzle guide vanes and variable effective area final nozzle, and by producing a high mass flow through the low pressure compressor which has an enlarged outlet area. In addition to the whole combination results in the speed of the low pressure shaft being variable independently of the high pressure shaft.

Preferably a row of nozzle guide vanes is mounted upstream of the low pressure turbine, at least part of each nozzle guide vane being movable to vary the effective area of the low pressure turbine nozzle and thereby, in conjunction with the variable outlet nozzle, control the low pressure turbine speed. According to a preferred construction, said low pressure turbine nozzle guide vanes have fixed upstream portions and hinged trailing edge portions whereby, in addition to varying the effective turbine nozzle area, movement of the trailing edge portions varies the effective angle of incidence of the gases entering the low pressure turbine.

In a preferred embodiment of the invention, an intermediate pressure axial flow compressor is disposed upstream of the high pressure compressor and downstream of the entry to the by-pass duct, said intermediate pressure compressor being driven by an independently rotatable intermediate pressure turbine disposed between the low and high pressure turbines. The intermediate and high pressure compressors in operation of the engine preferably run at substantially constant "corrected rotational speeds", the "corrected rotational speed" of a compressor being defined for the purpose of the present specification as N/T, where N is the rotational speed of the compressor and T the inlet temperature thereof.

The invention will be described, by way of example only, with reference to the accompanying drawing, which illustrates, in purely diagrammatic form and partly in section, a gas turbine engine in accordance with the present invention.

A gas turbine jet propulsion engine 10 for an aircraft comprises in flow series a low pressure axial flow compressor 11, an intermediate pressure axial flow compressor 12, a high pressure axial flow compressor 13, combustion equipment 14, a high pressure turbine 15, an intermediate pressure turbine 16, and a low pressure turbine 17. The low, intermediate and high pressure turbines 17, 16, 15 respectively are drivingly connected to the respective low, intermediate and high pressure compressors 11, 12, 13 respectively by way of respective independently rotatable shafts 18, 19, 21. The shafts 18, 19, 21 are nested coaxially, the shaft 18 being innermost and the shaft 21 outermost, and are mounted for rotation in respective bearings, indicated diagrammatically, which are supported directly or indirectly from fixed structure within the engine 10.

The hot gases from the combustion equipment 14, after passing successively through the three turbine 15, 16 and 17 in succession, are discharged into a jet pipe 22.

Downstream of the low pressure compressor 11, the outer casing of the engine 10 defines an annular by-pass duct 24 which communicates at its upstream end with the outlet end of the low pressure compressor 11. The by-pass duct 24 by-passes the intermediate pressure compressor 12, the high pressure compressor 13, the combustion equipment 14 and the high, intermediate and low pressure turbines 15, 16, 17 and communicates at its downstream end with the jet pipe 22 by way of a mixing device wherein the hot turbine exhaust gases are mixed with the relatively cool by-pass air. The mixing device comprises in this example a plurality of angularly spaced apart radially inwardly extending mixing chutes 25.

The mixing device may have variable geometry and the effective flow cross-sectional areas of the chutes 25 may be varied by moving a wall 25' thereof radially outwardly by means of actuators 25".

Immediately downstream of the mixing chutes 25, the jet pipe 22 is provided with reheat combustion equipment indicated diagrammatically at 26. The preferred form of reheat combustion equipment 26 employs aerodynamic combustion stabilisers and has a short overall axial length.

The jet pipe 22 includes, downstream of the reheat combustion equipment 26, a reheat combustion zone 26a. In this zone the jet pipe 22 may be provided with articulated portions 22a, as known per se from the commonly assigned U.S. Pat. No. 3,438,400 incorporated herein by reference, to enable the downstream part of the jet pipe 22 to be inclined in a vertical plane with respect to the axis of the upstream part of the jet pipe 22, thereby permitting adjustment of the direction of jet efflux from the engine 10 between a horizontal (forward propulsion) and a substantially vertical (direct lift) direction.

The jet pipe 22 terminates in a variable area exhaust nozzle 27 which may comprise a plurality of angularly spaced apart articulated nozzle members 27a which are movable by means of respective actuators 27b between a maximum effective nozzle area position, and a minimum effective nozzle area position.

The low pressure compressor 11 comprises four rotor stages 32, 33, 34, 35 with three stator stages of stator blades 37, 38, 40 disposed between successive pairs of rotor stages: 33, 34; 33, 35 and downstream of the rotor stage 35 respectively. A row of struts 36 supports a bearing in which the rotor of the low pressure compressor 11 is mounted.

Control means 41 of any convenient type are provided for varying the angle of incidence of the stator blades 37, 38 and 40 of the low pressure compressor 11. Thus each stator blade 37, 38 40 is mounted for rotation about its longitudinal axis in a respective pivot in the outer casing of the low pressure compressor 11. The respective angles of incidence of each respective blade 37, 38, 40 may be controlled by means of actuators 37", 38", 40" respectively which are connected to respective crank arms 37', 38', 40' provided on each respective blade 37, 38 and 40 respectively, outwardly of the low pressure compressor casing.

In addition, if desired, the angle of incidence of the blades of one or more of the low pressure compressor rotor stages 32, 33, 34 and 35 may be variable.

The low pressure turbine 17 comprises two interconnected rotor stages 42, 43, each of which is preceded by a respective stage or guide vanes 44, 45. The upstream stage of guide vanes 44 constitutes a nozzle guide vane stage of the low pressure turbine 17. Each of the guide vanes 44 has a fixed leading edge portion 46 and a movable trailing edge portion 47. Each trailing edge portion 47 is pivotable by means of an external actuator 47' about an axis parallel to and spaced from the trailing edge of the respective guide vane 44, so as to vary the effective angle of incidence of the guide vane 44 and the effective area of the inlet nozzle to the low pressure turbine 17.

The nozzle guide vanes 45 also are variable by means of actuators 45' so as to give the best engine performance.

The intermediate pressure compressor 12 and high pressure compressor 13 together with the intermediate pressure turbine 16 and high pressure turbine 15 have in the illustrated embodiment fixed incidence rotor and stator blading and are designed to be run at a substantially constant "corrected rotational speed" as hereinbefore defined.

In the illustrated embodiment the high pressure turbine 15 is provided with a fixed row of inlet nozzle guide vanes 48 which are disposed mainly within the combustion equipment 14. Each of the guide vanes 48 has a hollow interior and an aperture or apertures in its wall through which dilution air is introduced into the hot gases in the combustion equipment 14 prior to their entry into the high pressure turbine.

The nozzle guide vanes 48 of the high pressure turbine 15 and the nozzle guide vanes 49 of the intermediate pressure turbine 16 can be arranged to be varied by actuators 48' and 49' respectively to provide for more accurate control of the high pressure and intermediate pressure compressors and turbines to a constant corrected speed.

In operation of the engine 10 the mass flow of air through the low pressure compressor 11 is determined basically by the rotational speed of the compressor 11 and therefore, since this compressor is connected to the low pressure turbine 17, by the rotational speed of this turbine.

The mass flow through the low pressure compressor 11 is also affected by the area of the exhaust nozzle 27 and by the setting of the variable incidence stator blades 37, 38 and 40.

The rotational speed of the low pressure turbine 17 is basically controlled by the setting of the variable nozzle guide vanes 44 and by the area of the exhaust nozzle 27. Consequently, by controlling the effective flow area between the nozzle guide vanes 44 and the area of the exhaust nozzle 27, the speed of the turbine 17, and therefore the speed of the low pressure compressor 11, can be controlled.

The design of the low pressure compressor 11 is such that it passes a higher mass flow at lower rotational speeds than a conventional axial flow compressor. To this end the annulus area of the compressor 11 is arranged to decrease towards the high pressure end of the compressor 11 to a lesser extent than the annulus area of a conventional compressor. This annulus area variation of the low pressure compressor 11 ensures that the compressor is theoretically operating most efficiently with substantially uniform flow velocity from its inlet to its outlet end at approximately the centre of its useful rotational speed range.

The variable incidence stator blades 37, 38 and 40 are provided to enable the mass flow through the low pressure compressor 11 to be increased from the value which it would otherwise have at lower rotational speeds with the reduced pressure rise through the compressor 11. This enlarged annulus entails a small loss of efficiency at higher rotational speeds; here, again, the variable stator blades are used to minimise the actual loss of efficiency incurred at higher rotational speeds.

Since the intermediate and high pressure compressors 12, 13 run at substantially constant corrected rotational speed they pass a substantially constant corrected mass flow. Therefore variation of the rotational speed and/or pressure of the low pressure compressor 11 will have the effect of varying the relative amount of air discharged by the low pressure compressor 11 into the by-pass duct 24, that is the effective by-pass ratio of the engine 10.

When engine 10 is to be operated to provide high thrust at transonic speed for rapid acceleration the low pressure system comprising the low pressure compressor 11 and low pressure turbine 17 is run as fast as possible. This gives the highest corrected mass flow into the engine 10 together with the highest pressure rise through the low pressure compressor. Consequently the engine takes in as much air as possible which can then be utilised in the main and reheat combustion systems to burn fuel. The engine in this condition produces its maximum thrust per pound of air taken in.

The overspeeding of the low pressure compressor 11 causes the by-pass ratio of the engine to be low since the low pressure compressor passes relatively less air against a higher jet pipe pressure. As the aircraft accelerates from subsonic speed up to a speed of, for example, Mach 2, the rotational speed of the low pressure compressor 11 must be progressively reduced to maintain firstly the turbine entry temperature below a given limit and secondly to avoid an excessive pressure and/or temperature at the outlet of the high pressure compressor 13 as the aircraft approaches this speed.

When the aircraft is flying at its supersonic cruise speed the low pressure compressor 11 will be running relatively slowly to avoid the excessive high pressure compressor outlet pressure and/or temperature mentioned above and the by-pass ratio of the engine 10 will therefore be relatively high. In this condition the reheat combustion equipment 26 will be operating.

Thus for the acceleration initially the guide vanes 44 are set so that the rotational speed of the low pressure compressor 11 is high and they are adjusted during the acceleration to reduce the low pressure compressor speed. Simultaneously the variable stator blades 37, 38 and 40 are adjusted from their original position until they are finally in a position permitting the maximum mass flow through the low pressure compressor 11 at the lower rotational speed required when the aircraft is travelling at its supersonic speed while maintaining the optimum low pressure compressor efficiency. The reheat combustion equipment 26 will be operating throughout this manoeuvre, the variable area exhaust nozzle 27 and the variable area nozzle guide vanes controlling the expansion ratio across the turbines and the pressure ratio across the low pressure compressor.

When the aircraft is cruising subsonically a relatively very low thrust is required from the engine 10 and in order to achieve a good fuel consumption, a relatively high by-pass ratio is necessary. Therefore at subsonic cruising speed the low pressure compressor 11 is run at relatively low rotational speed as it is at supersonic cruising speed. In this condition the low pressure compressor 11 passes its relatively higher mass flow giving a higher by-pass ratio and therefore good fuel consumption in these conditions. The low pressure turbine nozzle guide vanes 44 are set to cause the low pressure system to rotate relatively slowly and the final nozzle area and variable stators 37, 38 and 40 adjusted to maintain efficient operation of the low pressure compressor 11. In this condition the by-pass ratio and the correct mixing pressure conditions will be about 1.8:1 in the example illustrated.

We claim:

1. A by-pass gas turbine jet propulsion engine comprising in flow series independently rotatable low and high pressure axial flow compressors, combustion equipment, independently rotatable high and low pressure turbines drivingly connected to the high and low pressure compressors respectively, an exhaust duct, a by-pass duct which is arranged to receive at its upstream end a proportion of the air compressed by the low pressure compressor, a mixing device providing a large area of communication between the downstream end of said by-pass duct and said exhaust duct, reheat combustion equipment disposed in said exhaust duct downstream of said mixing device, the low pressure turbine having at least one stage of variable nozzle guide vanes and the exhaust duct having an outlet nozzle of variable effective area, said low pressure compressor and said low pressure turbine having their rotational speed controlled by controlling said nozzle guide vanes and said outlet nozzle, said low pressure compressor having an outlet end which has an annulus area which is larger than conventional for efficient operation of said low pressure compressor at the higher rotational speed end of its useful speed range, the annulus area of said low pressure compressor decreasing toward the high pressure end of the compressor to an extent such that the compressor has substantially uniform flow velocity from its inlet to its outlet end at approximately the center of its useful speed range, and said low pressure compressor having a plurality of stages, at least the stage nearest the high pressure compressor being provided with a stage of variable incidence stator blading whereby the low pressure compressor is adapted to pass a relatively high mass flow at lower rotational speeds of its useful speed range, the effective by-pass ratio of the engine being controlled by controlling the rotational speed of the low pressure compressor and turbine and effective area of the outlet nozzle.

2. An engine as claimed in claim 1 in which a row of nozzle guide vanes is mounted upstream of the low pressure turbine, at least part of each nozzle guide vane being movable to vary the effective area of the low pressure turbine nozzle and thereby, in conjunction with the variable outlet nozzle, control the low pressure turbine speed.

3. An engine as claimed in claim 2 in which the low pressure turbine nozzle guide vanes have fixed upstream portions and hinged trailing edge portions whereby, in addition to varying the effective turbine nozzle area, movement of the trailing edge portions varies the effective angle of incidence of the gases entering the low pressure turbine.

4. An engine as claimed in claim 1 in which an intermediate pressure axial flow compressor is disposed upstream of the high pressure compressor and downstream of the entry to the by-pass duct, said intermediate pressure compressor being driven by an independently rotatable intermediate pressure turbine disposed between the low and high pressure turbines.

5. An engine according to claim 4 in which the low, intermediate and high pressure turbines are drivingly connected to the respective low, intermediate and high pressure compressors by respective coaxially arranged shafts, the outermost shaft being connected to the high pressure turbine and the innermost shaft to the low pressure turbine.

6. An engine as claimed in claim 4 in which the intermediate and low pressure compressors in operation of the engine run at substantially constant corrected rotational speed.

7. An engine as claimed in claim 1 in which a row of inlet nozzle guide vanes for the high pressure turbine is mounted within the combustion equipment, the said guide vanes having hollow interiors and apertures in their walls through which dilution air is introduced into the hot combustion gases.

8. In a by-pass gas turbine jet propulsion engine of the type including in flow series independently rotatable low and high pressure axial flow compressors, combustion equipment, independently rotatable high and low pressure turbines drivingly connected to the high and low pressure compressors respectively, an exhaust duct, and a by-pass duct which is arranged to receive at its upstream end a portion of the air compressed by the low pressure compressor the improvement comprising:

a mixing device which provides a large area of communication between the downstream end of said by-pass duct and said exhaust duct;

reheat combustion equipment disposed in said exhaust duct downstream of said mixing device; and means for controlling the effective ratio of the amount of air passing through said by-pass duct to the amount of air passing to said combustion equipment so as to produce efficient operation at cruise speed as well as high thrust when needed, said means comprising (a) at least one stage of variable nozzle guide vanes in said low pressure turbine and means for adjusting said variable nozzle guide vanes, (b) said low pressure compressor having an outlet end which has an annulus area which is larger than conventional for efficient operation of said low pressure compressor at the higher rotational speed end of its useful speed range, the annulus area of said low pressure compressor decreasing toward the high pressure end of the compressor to an extent such that the compressor has substantially uniform flow velocity from its inlet to its outlet end at approximately the center of its useful speed range, said low pressure compressor having a plurality of stages, at least the stage nearest said high pressure compressor having a stage of variable incidence stator blading whereby said low pressure compressor is adapted to pass a relatively high mass flow of air at lower rotational speeds of its useful speed range, and means for adjusting said variable incidence stator blading, and (c) an exhaust nozzle of variable effective area receiving mixed by-pass air and combustion products from said exhaust duct and means for varying said effective area, whereby cruising of the aircraft in which the engine is mounted at supersonic and subsonic speeds is effected efficiently by operating said low pressure compressor at relatively low speed so as to produce a high by-pass ratio, and whereby high thrust is effected by operating said low pressure compressor at relatively high speed so as to produce a low by-pass ratio.

* * * * *